Patented Aug. 27, 1935

2,012,621

UNITED STATES PATENT OFFICE 2,012,621

METHOD OF PRODUCING ANHYDROUS AMMONIA

James L. Bennett, Wilmington, Del., assignor to Hercules Powder Company, Wilmington, Del., a corporation of Delaware Application February 9, 1932, Serial No. 591,916

6 Claims. (Cl. 23—193)

This invention relates to a method for producing anhydrous ammonia either in liquid or gaseous form. More particularly, the method embodying this invention involves the production of anhydrous ammonia from solutions of ammonia in water.

As is well known, an abundant supply of ammonia as a water solution is available from illuminating gas or coke oven gas purification plants. Such solutions as such are, however, totally unsuited for various uses such, for example, as in the preparation of nitric acid by ammonia oxidation, and hence various methods for the production of anhydrous ammonia from such solutions have been proposed.

Heretofore it has been proposed to produce anhydrous liquid ammonia from ammonia solutions, such as are obtained from illuminating gas purification plants, by running the solution down a packed tower or plate tower at atmospheric pressure in counterflow with steam. With the use of sufficient steam ammonia-free water is obtained from the bottom of the tower and from the top of the tower ammonia gas mixed with a small amount of water. This water is removed by a partial condenser and returned to the tower. The ammonia gas may be liquefied to anhydrous liquid ammonia by suitable compression and cooling. Such procedure for the production of anhydrous liquid ammonia involves the additional operation of compression of the ammonia gas by a mechanical compressor, with a substantial power consumption therefor.

Heretofore it has also been proposed to generate ammonia gas from an aqueous ammonia solution by boiling with steam and passing upwardly through a plate column, which separates most of the ammonia from the water solution thereof. The separated ammonia, under pressure due to its generation under pressure, is then passed to a suitably cooled condenser in which it is liquefied. With such procedure, however, the effluent liquid which leaves the boiler below the plate tower is by no means stripped free of ammonia and, in fact, contains a substantial amount of ammonia, say about 7%.

Now, in accordance with this invention, it has been found that if a solution of ammonia in water, such as is obtainable from illuminating gas purification plants, is passed through a suitable packed tower under pressure in counterflow with steam under pressure, with suitable reflux as described below, the ammonia will be efficiently and substantially completely separated from the water and may be utilized directly as is, for example, in ammonia oxidation under pressure for the production of nitric acid, in gaseous form as separated or may be readily liquefied by passing the gas through a suitably cooled or refrigerated condenser.

As a result of the procedure embodying this invention the ammonia gas will be separated from the solution in substantially water-free condition and will be substantially free from any non-volatile impurities. The effluent water will be found to be substantially free from ammonia, indicating substantially complete separation of the ammonia from the solution.

As has been indicated, the separated ammonia, which generally will be substantially water-free, containing 0.5% or less, may be used in gaseous form as separated or will be found to be readily liquefied by passing through, for example, a water cooled condenser, since the gas as separated will be under necessary pressure for ready liquefaction or cooling.

Having indicated in a general way the nature and purpose of this invention, I will proceed to describe a practical adaptation of the method in detail in connection with description of suitable forms of apparatus with reference to the accompanying drawings in which.

Figure 1:
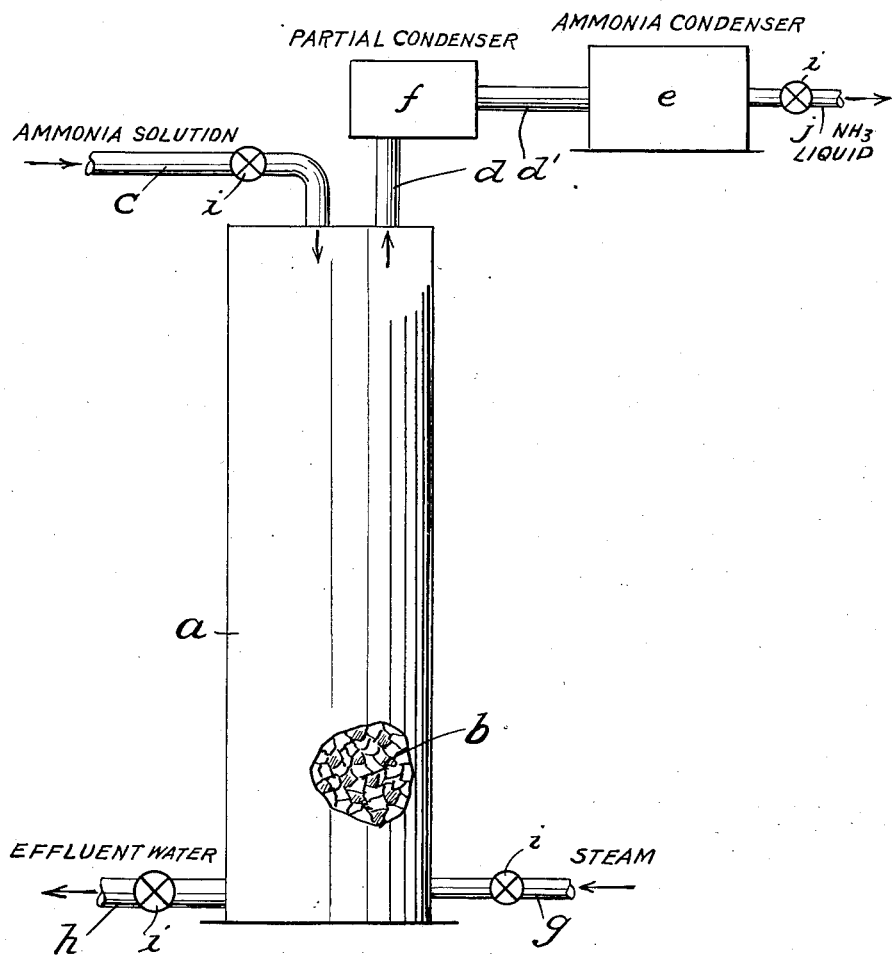
Figure 1 illustrates diagrammatically forms of apparatus adaptable for use in carrying out the method.

With reference to the drawings in Figure 1, $a$ indicates a tower of suitable height and diameter, say for example, of a height of 40 feet and of a diameter of 14 inches. The tower is packed with any suitable inert packing material $b$. The packing material may, for example, be pieces of quartz or porcelain rings. A conduit $c$ enters the tower at or adjacent to its top and is adapted for the discharge into the tower of aqueous ammonia solution under pressure. The aqueous ammonia solution may be derived from any suitable storage and will be discharged into the tower under suitable pressure by means of any suitable pump. A pipe $d$ enters the tower at or adjacent to the top and is adapted for the escape from the tower of separated ammonia gas and water vapor and for return of condensate. The pipe $d$ leads to a suitably cooled condenser $f$ in which the ammonia gas and water vapor, which will be discharged from the top of the tower under pressure, will be partially liquefied. The conduit $d'$ passes to the condenser $e$, in which the substantially water-free ammonia gas may be condensed. The partial condenser $f$ will be so arranged that the condensate resulting from the partial condensation of water vapor and ammonia, will flow back into the tower as reflux liquid.

A conduit $g$ enters the tower at or adjacent to its bottom and is adapted for the discharge into the tower of steam under pressure. The steam may be derived from any suitable source. A conduit $h$ enters the tower at or near its bottom and is adapted for the discharge from the tower of effluent water.

Conduits $c$ and $g$ for the supply of ammonia solution and steam to the tower and the conduits $d$ and $h$ for the discharge of ammonia gas and effluent water from the tower are provided with suitable valves indicated by the reference character $i$.

Liquid ammonia may be discharged from the condenser $e$ through a valved conduit $j$ and suitably stored for such use as it may be intended. On the other hand, the ammonia gas discharged from the tower may be utilized as gas in admixture with a suitable quantity of air for the production of nitric acid, for example, by the ammonia oxidation process utilizing a platinum or other catalyst. The gas may be led directly to ammonia oxidation apparatus or may be handled in any desired manner.

In carrying out the method in accordance with this invention, the ammonia solution and the steam may be introduced into the tower under any suitable pressure, such that the desired separation of ammonia gas will be effected. Preferably, the ammonia solution and saturated steam will be introduced into the tower under a pressure within say about the range 120–150 pounds gauge pressure, it being understood that the steam will have a temperature corresponding to its pressure, as is well known, in order to effectively boil the ammonia off from the solution. The system, including the tower and condenser, will be a closed system and the pressure or substantially the pressure at which the ammonia solution and steam are introduced into the tower will obtain throughout the system. Thus, the separation of the ammonia from the solution will be effected under pressure, which pressure will obtain in the condenser enabling the ready liquefaction of the ammonia gas. The effluent water will be discharged under pressure.

As illustrative of the practical adaptation of this invention utilizing the apparatus as illustrated and described, for example, aqueous ammonia solution is introduced into the top of the tower $a$ through the conduit $c$ under gauge pressure of say about 135 pounds per square inch and steam is introduced into the bottom of the tower say under a gauge pressure of about 135 pounds per square inch and at a temperature of say about 181° C. The ammonia solution and the steam will be counterflowed downwardly and upwardly respectively through the tower. The steam will cause the ammonia to be boiled out of the solution and the ammonia in the form of a gas will escape from the tower under pressure through the conduit $d$. The ammonia will pass through the partial condenser in which any water vapor carried by the ammonia gas will be condensed, and will return with any ammonia which is condensed in the tower. The ammonia gas on leaving the partial condenser may be led to storage or to, for example, ammonia oxidation apparatus or it may be passed through the suitably cooled condenser $e$ wherein the ammonia will be liquefied and from which the liquid ammonia may be drawn for use or storage. Effluent water will be discharged through the conduit $h$. In carrying out the process, the several valves $i$ will be set to suitably adjust the supply of ammonia solution and of steam and the discharge of ammonia gas and effluent water and for the maintenance of pressure in the system.

Figure 2:
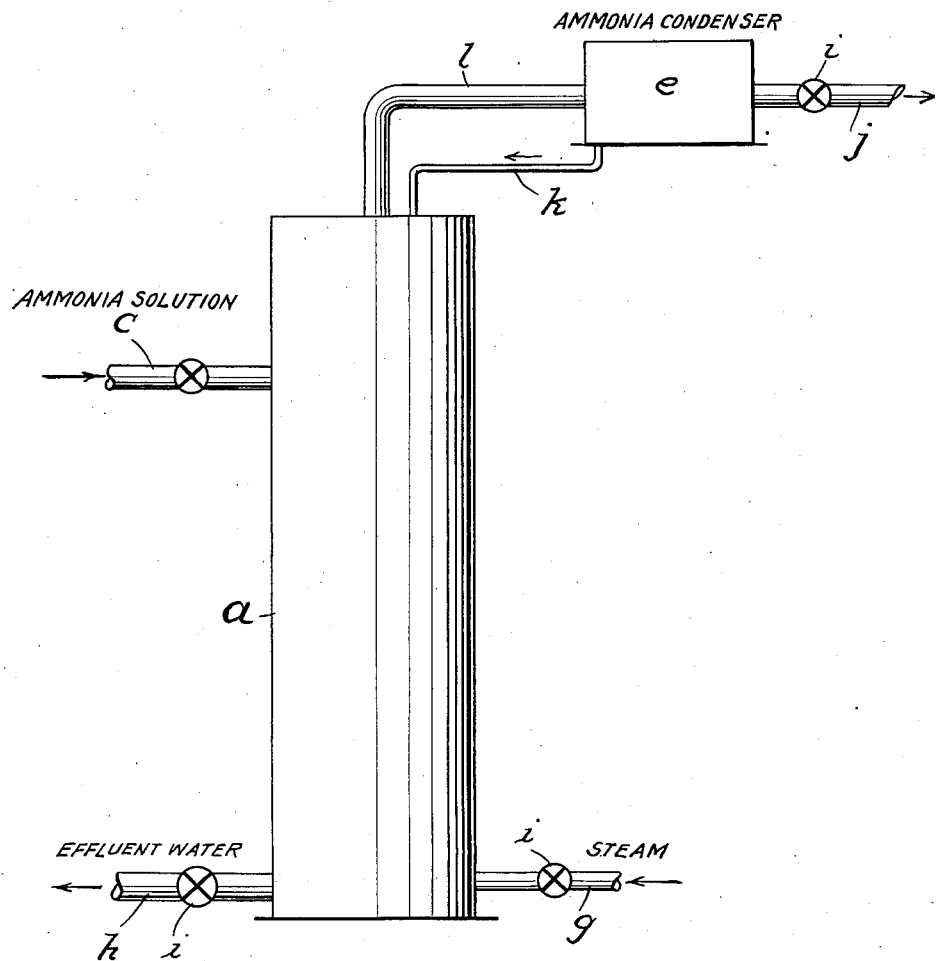
Figure 2 illustrates diagrammatically a modified form of the apparatus shown in Figure 1.

If desired, in carrying out the method in accordance with this invention the partial condenser $f$ may be omitted. As illustrative of procedure and of a satisfactory form of apparatus where the partial condenser $f$ is omitted, reference is made to Figure 2, from an inspection of which it will be noted that with elimination of the partial condenser the aqueous ammonia solution is introduced into the tower $a$ at a point below the top of the tower say, for example, a point about 20% below the top of the tower, the gas leaving the tower is led directly to the condenser $e$ through a conduit $j$ and provision is made for the return from conduit $k$ to the top of the tower of some condensate from condenser $e$. In carrying out the procedure in accordance with this invention, using, for example, the apparatus shown in Figure 2, the condensate or reflux returned to the top of the tower from condenser $e$ will be cool and will operate to cause a condensation out of the gas leaving the tower of any water vapor contained therein so that the gas leaving the tower will be substantially anhydrous ammonia gas and the condensate from condenser $e$ will be substantially anhydrous liquid ammonia. The condensate or reflux returned to the tower will be substantially anhydrous liquid ammonia and will be revaporized in the tower for ultimate recovery as anhydrous liquid ammonia.

It will be understood that the practical adaptation of the method embodying this invention is independent of any particular form of apparatus, the apparatus illustrated and described in connection with description of the method being illustrated and described merely for purposes of illustration.

What I claim and desire to protect by Letters Patent is:

1. The method of producing anhydrous ammonia which includes introducing an aqueous ammonia solution under a pressure of about 120–150 pounds per square inch gauge pressure into the top of a tower, introducing steam under a pressure of about 120–150 pounds per square inch gauge pressure at the bottom of the tower, withdrawing from the tower ammonia gas separated from the ammonia solution and condensing the ammonia gas without releasing the pressure therefrom.

2. The method of producing anhydrous ammonia which includes introducing an aqueous ammonia solution under a pressure of about 135 pounds per square inch into the top of a tower, introducing steam under a pressure of about 135 pounds per square inch at the bottom of the tower, withdrawing from the tower ammonia gas separated from the ammonia solution and condensing the ammonia gas without releasing the pressure therefrom.

3. The method of producing anhydrous ammonia which includes counterflowing an aqueous ammonia solution and steam in a fractionating tower, condensing water vapor from the ammonia gas outside of the tower and returning the condensate to the tower and condensing the ammonia gas by cooling it to a temperature not below 0° C. while maintaining the requisite pressure in the tower and condensers.

4. The method of producing anhydrous ammonia which includes counterflowing an aqueous ammonia solution and steam in a fractionating tower, condensing water vapor from the ammonia gas outside of the tower and returning the condensate to the tower, condensing the ammonia gas by cooling it to a temperature not below 0° C. while maintaining the requisite pressure in the tower and condensers and discharging effluent water from the tower.

5. The method of producing anhydrous ammonia which includes introducing an aqueous ammonia solution under pressure into the top of a fractionating tower, introducing steam under pressure at the bottom of the tower, withdrawing from the tower ammonia gas separated from the ammonia solution under the pressure obtaining in said tower, condensing water vapor from the ammonia gas and returning the condensate to the tower, and cooling the ammonia gas to a temperature not below 0° C. while maintaining said pressure, said pressure being sufficient to liquefy the ammonia gas at the temperature to which it is cooled.

6. The method of producing anhydrous ammonia which includes introducing an aqueous ammonia solution under pressure into the top of a fractionating tower, introducing steam under pressure at the bottom of the tower, withdrawing from the tower ammonia gas separated from the ammonia solution under the pressure obtaining in said tower, condensing water vapor from the ammonia gas and returning the condensate to the tower, and cooling the ammonia gas to a temperature not below 0° C. while maintaining said pressure.

JAMES L. BENNETT.